United States Patent

Weber et al.

[11] Patent Number: 5,133,060
[45] Date of Patent: Jul. 21, 1992

[54] DISK CONTROLLER INCLUDES CACHE MEMORY AND A LOCAL PROCESSOR WHICH LIMITS DATA TRANSFERS FROM MEMORY TO CACHE IN ACCORDANCE WITH A MAXIMUM LOOK AHEAD PARAMETER

[75] Inventors: Theodore E. Weber; Paul V. Tischler, both of Austin, Tex.

[73] Assignee: Compuadd Corporation, Austin, Tex.

[21] Appl. No.: 361,227

[22] Filed: Jun. 5, 1989

[51] Int. Cl.⁵ .............................................. G06F 13/10
[52] U.S. Cl. .............................. 395/425; 364/DIG. 1; 364/DIG. 2; 364/238.4; 364/243.41; 364/260; 364/261.7; 364/263.1; 364/963.3; 364/964.3
[58] Field of Search ... 364/200 MS File, 900 MS File; 395/425

[56] References Cited

U.S. PATENT DOCUMENTS

| | | | |
|---|---|---|---|
| 4,168,541 | 9/1979 | Dekarske | 364/200 |
| 4,399,503 | 8/1983 | Hawley | 364/200 |
| 4,533,995 | 8/1985 | Christian et al. | 364/200 |
| 4,807,110 | 2/1989 | Pomerene et al. | 364/200 |
| 4,868,734 | 9/1989 | Idleman et al. | 364/200 |
| 4,882,642 | 11/1989 | Tayler et al. | 364/900 |
| 4,920,478 | 4/1990 | Furuya et al. | 364/200 |
| 4,928,239 | 5/1990 | Baum et al. | 364/200 |
| 4,972,364 | 11/1990 | Barrett et al. | 364/900 |

Primary Examiner—Thomas C. Lee
Assistant Examiner—Mehmet Gechil
Attorney, Agent, or Firm—Baker & Botts

[57] ABSTRACT

A controller (10) for use with a hard disk (38) or other mass storage medium provides a memory cache (36). A block descriptor table (40) is divided into a plurality of sets (42), depending upon the size of the memory cache (36). Each set is similarly indexed to define memory groups (44) having tag, cache address, and usage information. Upon a read command, an index is generated corresponding to the address requested by the host computer, and the tag information is matched with a generated tag from the address. Each set is checked until a hit occurs or a miss occurs in every set. After each miss, the usage information (50) corresponding to the memory group (44) is decremented. When reading information from the storage device (32) to the memory cache (36), the controller (10) may selectively read additional sectors. The number of sectors read from the storage device may be selectively controlled by the user or the host processor. Further, a cap may be provided to provide a maximum number of sectors to be read.

3 Claims, 3 Drawing Sheets

| | |
|---|---|
| HARDCACHE/ES OPTIONS MENU   VER 1.1<br>COPYRIGHT (C) 1989 COMPUADD CORP.<br>AUSTIN, TEXAS    ALL RIGHTS RESERVED | DISK/CACHE STATISTICS |
| | CACHE SIZE    >         4096K<br>SETS: 8     SET SIZE    512K |
| >  >   FLUSH CACHE           NO  <  <<br>       CACHE IS              ON<br>       READ AHEAD FACTOR     2<br>       READ AHEAD CAP       16<br>    >  >  >  CHANGES APPLIED  <  <  < | SECTORS READ:         1000<br>CACHE HITS:            988<br>HIT PERCENTAGE:      98.0% |
| | SECTORS WRITTEN:       10 |
| UP/DOWN ARROW TO SELECT OPTION<br>LEFT/RIGHT ARROW TO MODIFY SELECTION<br><ENTER> TO PERFORM SELECTED OPTION<br><ESC> TO EXIT WITHOUT MODIFICATION<br>PRESS F1 FOR HELP | TOTAL SECTORS:       1010<br>PERCENTAGE READS:    99.0%<br>PERCENTAGE WRITES:    1.0%<br>TOTAL COMMANDS:       226<br>SECTORS/COMMAND:      4.47 |

*FIG. 5*

DISK CONTROLLER INCLUDES CACHE MEMORY AND A LOCAL PROCESSOR WHICH LIMITS DATA TRANSFERS FROM MEMORY TO CACHE IN ACCORDANCE WITH A MAXIMUM LOOK AHEAD PARAMETER

TECHNICAL FIELD OF THE INVENTION

This invention relates in general to computers, and more particularly to a storage device controller having a look-ahead cache memory for interfacing with a fixed disk or other storage devices.

BACKGROUND OF THE INVENTION

Most computers use a mass storage device, such as a fixed (or "hard") disk, to retain large quantities of information, such as application programs and data. Typically, the mass storage devices use a magnetic recording media to store the information, although newer devices use laser technology which reads information from a disk encoded with pits representing binary values. For personal computing, a mass storage device holding 20 to 40 megabytes is usually sufficient; however, computers used in business often use well in access of 40 megabytes. For computers used as servers on a network, 300 megabytes is generally required.

While state of the art fixed disks systems have access times of 16-18 milliseconds and data transfer rates of 600-1000 kilobytes/sec, the speed with which data may be retrieved from a fixed disk is significantly slower than the speed with which data may be retrieved from a semiconductor memory, such as a DRAM, and is much slower than the operating speed of the microprocessor. Hence, the microprocessor will remain idle for significant periods of time while it is waiting for data from the fixed disk. Consequently, caching systems, which store portions of the fixed disk's information within a semiconductor memory, have been developed to increase the effective speed of data transfers from the disk to the host computer.

A cache memory is typically situated between the host computer and the hard disk or other mass storage medium. The cache memory stores information from the hard disk which is expected to be the most frequently accessed. When the host computer requests a block of data from the hard disk, the contents of the cache memory are examined to determine whether the requested data is currently stored in the cache. If the data is in the cache memory (a "hit"), then the data is taken directly from the cache memory, thereby circumventing a disk access. If the data is not in the cache memory (a "miss"), then the requested information is read from the disk into the cache memory, and from the cache memory to the host computer.

The effectiveness of a cache memory depends upon a number of factors. Of primary importance are the method by which data is removed from the cache memory to provide space for new data and the method by which the contents of the cache memory may be read. The first concern, the method by which information is removed from the cache memory, is important because some types of information will be accessed more frequently than others. If frequently requested information is removed from the cache memory to provide room for new data from the disk, then the hit ratio will be significantly reduced. The second concern, the speed at which the contents of the cache may be read, is important because a determination of whether the requested information is stored in the cache memory must be made on every disk access request.

Prior art cache memory systems, while significantly improving the effective data transfer rate between the host computer and the mass storage medium, have not sufficiently addressed these problems. Therefore, a need has arisen in the industry for a mass storage controller having an efficient cache memory.

SUMMARY OF THE INVENTION

In accordance with the present invention, a cache controller is provided which substantially eliminates or prevents the disadvantages and problems associated with prior controllers.

The controller of the present invention uses a cache memory to store information which also resides on a mass storage device, typically a fixed disk. In the event of a cache miss, information from the storage device is read into the cache memory. In addition to the sectors requested by the host processor, additional sectors are read in order to anticipate a subsequent request. The number of additional sectors is computed as a function of the number of sectors requested by the host processor.

In one aspect of the present invention, the total number of sectors read into the cache memory is determined by multiplying the number of sectors requested by a predetermined factor. The predetermined factor may be selectively chosen by the user, or may be chosen by the application program being executed by the processor. One implementation of the multiplication is to use a shift register which shifts the parameter representing the requested number of blocks by a predetermined number of places in order to perform a multiplication by 1, 2, 4 or 8.

In a second aspect of the present invention, a cap is provided such that the number of additional sectors read into the cache memory are limited.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates a screen display used in connection with the present invention providing user-specification of the read-ahead factor and cap.

DETAILED DESCRIPTION OF THE INVENTION

The preferred embodiment of the present invention is best understood by referring to FIGS. 1-4 of the drawings, like numerals being used for like and corresponding parts of the various drawings.

For purposes of illustration, the controller of the present invention will be described herein as a fixed disk controller, although the controller may be used with other peripheral devices wherein a fast transfer rate between the host computer and the peripheral device is needed. Also for illustration purposes, the controller will be described in connection with an IBM AT bus configuration and an ESDI disk interface.

Information stored on a disk is organized in tracks, each of which comprise one circle on a disk. Each track is segmented into a number of "sectors" or "blocks" which may be individually addressed by the host computer. Most disk drives include a plurality of stacked disks, most disks having two readable surfaces and associated read/write heads. A "cylinder" describes the set, all tracks having the same distance from the center of the disks. The host computer reads and writes information to and from the disk by providing a starting address defined by cylinder, head and sector. The host computer also provides a number indicating the number of sectors which it desires to read or write. A drive identifier is also provided by the host computer.

Figure 1:
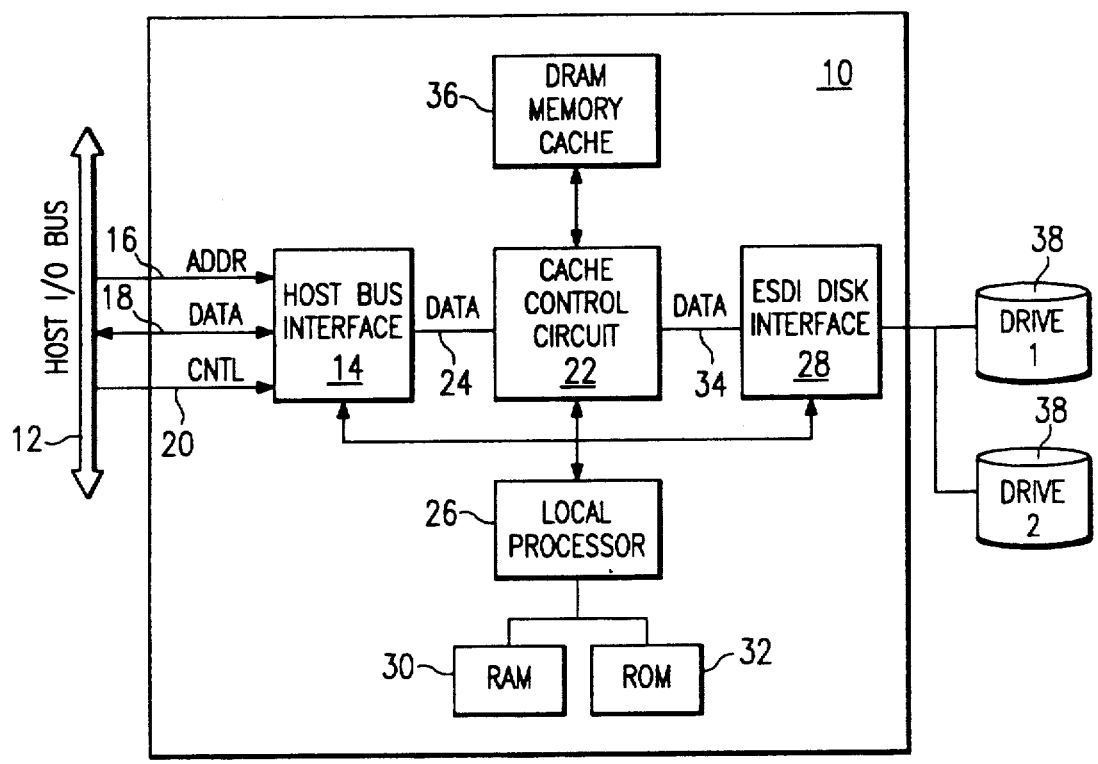
FIG. 1 illustrates a block diagram of the cache controller of the present invention.

FIG. 1 illustrates a block diagram of the controller 10 of the present invention. The controller 10 is connected to the host I/O bus 12 of the host computer. A host bus interface 14 is connected to the host I/O bus 12 over an address bus 16, a data bus 18 and control bus 20. The host bus interface 14 is connected to a cache control circuit 22 by a data bus 24. The host bus interface 14 is also connected to a local processor 26. The local processor 26 is also connected to the cache control circuit 22 and a disk interface 28. The local processor 26 has a local RAM memory 30 and a local ROM memory 32. The cache control circuit 22 is connected to the disk interface 28 by a data bus 34. The cache control circuit 22 is also connected to a DRAM memory cache 36. The disk interface 28 connects to a plurality of drives 38.

In the preferred embodiment, the DRAM cache memory comprises a plurality of memory banks, such that the user may select the size of the cache. For example, if four banks are provided in the memory cache, the user may select from 256 kilobytes to 1 megabyte using 256K memory chips. Alternatively, the user could have a memory cache ranging from 1 to 4 megabytes of memory using 1 megabyte memory chips. While DRAMs (dynamic random access memories) are used in the illustrated embodiment, other types of RAMs, such as static RAMs, could also be used.

The host bus interface 14, cache control circuit 22 and disk interface 28 are of conventional design. The host bus interface includes a plurality of registers which hold address and control information. For example, the host bus interface has registers which hold the starting address information including cylinder, head and sector addresses, the number of sectors to be read or written, and the drive being accessed. Further, the host bus interface 14 contains circuitry for data transfer handshaking.

The cache control unit 22 operates under control of the local processor 26. The local processor instructs the cache control circuit 22 the addresses where information should be written to and read from the memory cache 36. The cache control circuit 22 typically includes FIFOs connected to each data bus 24 and 34 and arbitration circuitry which controls which data bus 24 or 34 communicates with the memory cache 36. Further, the cache control circuitry 22 includes DMA (direct memory access) circuitry such that data is transferred from the memory cache 36 to the host bus interface 14 or the disk interface 28 without control of the local processor 26.

The disk interface 28 is of conventional design. Although an ESDI disk interface is illustrated, other interface protocol such as SCSI, ST506, ST412 or IDE could also be used. The disk interface 28 provides bit level control of the drives 38 and provides the serial-to-parallel and parallel-to-serial conversion of the data.

In operation, the controller 10 receives read and write requests from the host computer over the host I/O bus 12. During a read request, the local processor 23 determines whether the requested information is stored in the DRAM memory cache 36. If a hit occurs, the data is read from the DRAM memory cache rather than from one of the drives 38. Alternatively, if a miss occurs, the data is read from the requested drive 38 into the DRAM memory cache 36, and subsequently, from the DRAM memory cache 36 to the host computer. In this way, the most recently requested data is always present in the DRAM memory cache 36.

Figure 2:
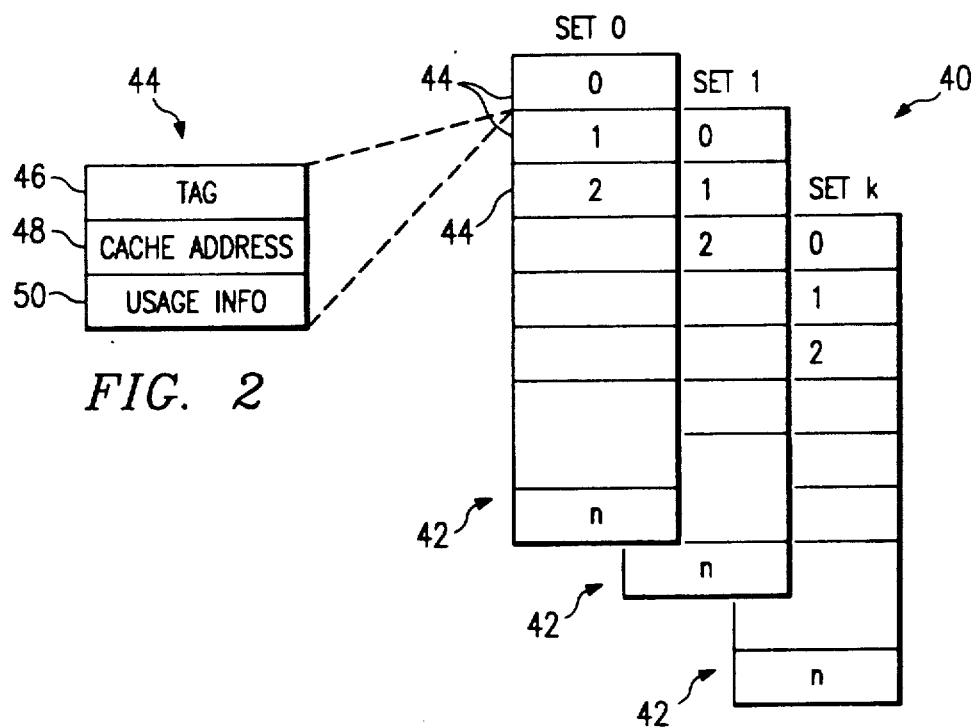
FIG. 2 illustrates a block diagram of the block descriptor table.

A description of the contents of the DRAM memory cache 36 is maintained in a block descriptor table stored in the local RAM 30. A block diagram illustrating the block descriptor table is illustrated in FIG. 2.

The block descriptor table 40 is broken into a plurality of sub-tables (hereinafter "sets") 42, labeled SET0 - SETk, k being determined based on the size of the memory cache 36. The size of the cache, and hence the number of sets, may be determined at power up. Table I illustrates optimum set allocations for various sizes of memory caches. Each set is divided into n memory groups 44, each addressable by an index corresponding to one of the n locations. The data stored in each memory group 44 includes a tag 46, a cache address 48 and usage information 50.

TABLE I

| | Set Allocations | | |
|---|---|---|---|
| 256 kB Banks | Sets | 1 MB Banks | Sets |
| 256 kB | 2 | 1 MB | 8 |
| 512 kB | 4 | 2 MB | 8 |
| 768 kB | 6 | 3 MB | 6 |
| 1024 kB | 8 | 4 MB | 8 |

Each index may be used to address any one of the sets 42 corresponding to a section of one of the drives 38. The drive memory corresponding to an index will comprise a number of sectors. Typically, the number of sectors corresponding to an index exceeds the number of sets 42 in the block descriptor table 40.

The tag information 46 identifies a sector within the relevant index. For example, if 128 sectors are comprehended by each index, a tag ranging from 0–127 may be stored in the tag field 46 of each memory group 44.

Figure 3:
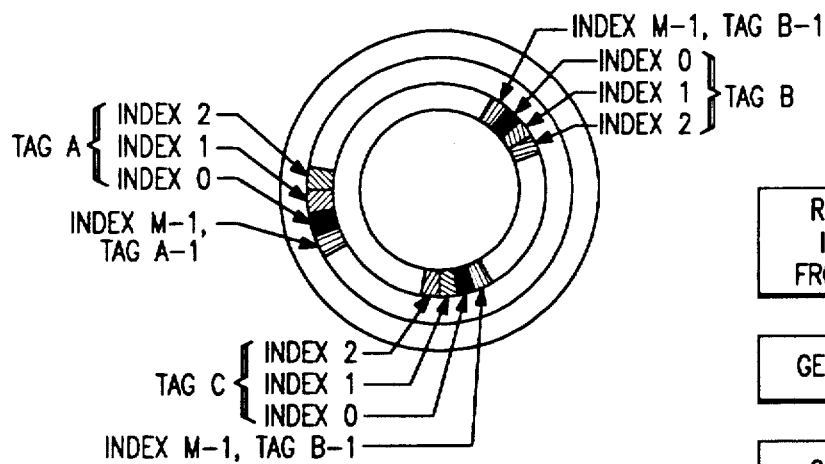
FIG. 3 illustrates a diagram of a hard disk showing the sectors covered by one index.

FIG. 3 illustrates a simplified hard disk, depicting the memory portion associated by one index. In FIG. 3, one index is shown to cover m sectors. Each sector covered by an index is associated with a tag, which distinguishes the sectors from one another. As can be seen, the sectors associated with each index are spread out over the disk addressable space, such that sectors which contain related information are unlikely to be associated with the same index.

Figure 4:
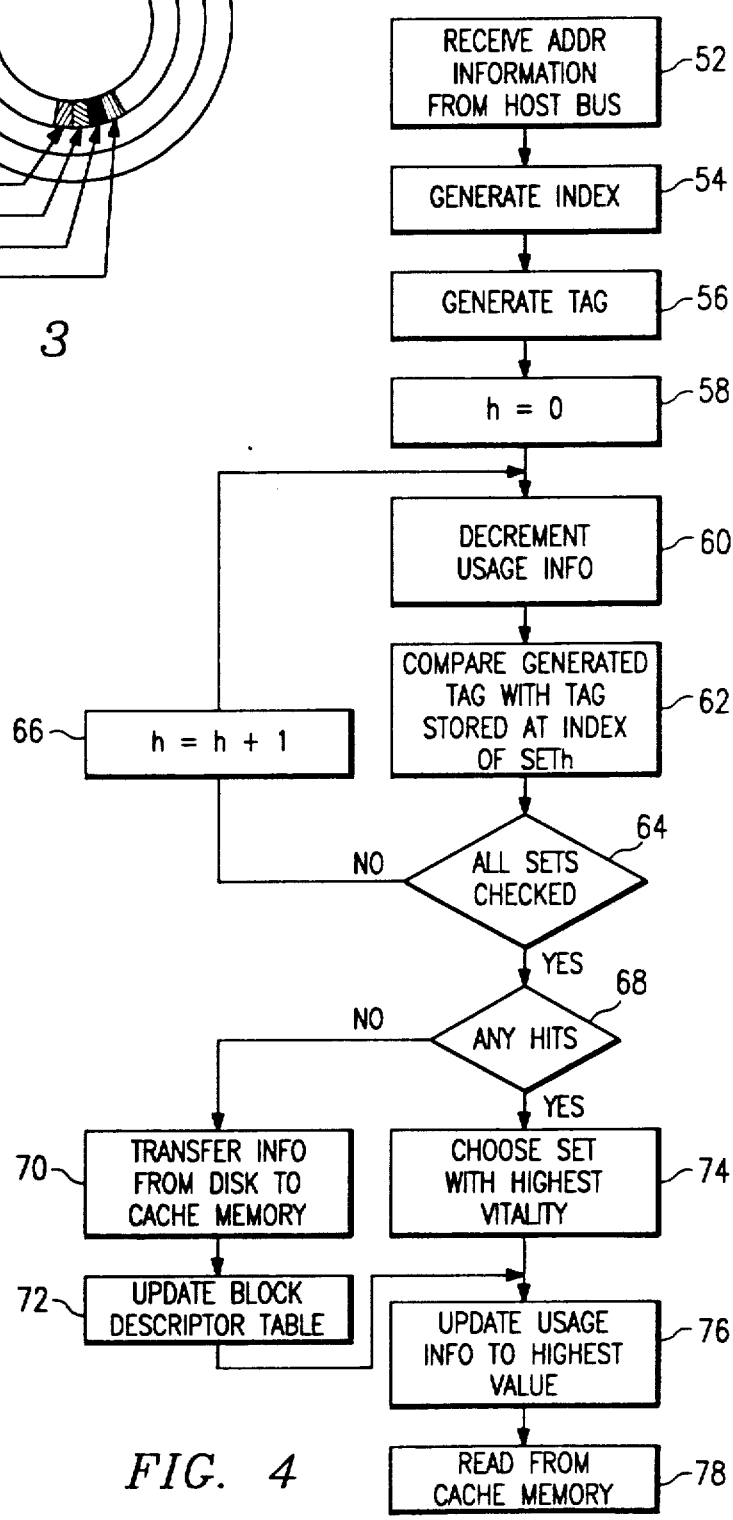
FIG. 4 illustrates a flow chart describing the method by which information is accessed from the cache memory.

FIG. 4 illustrates a flow chart describing operation of controller 10. Address information, as previously described, is received by the host bus interface 14 from the host I/O bus 12 (block 52). In block 54, the address information from the host computer is translated into the index corresponding to the starting address by the local processor 26 under control stored in ROM 32. A tag is also generated (block 56); the tag indicates which sector within the memory covered by the generated index is being requested by the host computer. In blocks 58-66, each set of the block descriptor table is accessed at the address corresponding to the generated index. In block 58, a counter h is set to 0 (the first set). The memory group 44 located at the address indicated by the generated index in set SETh is accessed. The usage information 50 in the memory group 44 at that address is decremented in block 60. The usage information will not be decremented below a minimum value, typically "1", indicating that the associated data in the memory cache 36 is still valid. The generated tag is then compared to the tag stored in the memory group 44 in block 62. In decision block 64 and block 66, h is incremented to the next set if all sets have not been checked. In short, in block 58-66, each set is sequentially addressed at the memory location corresponding to the generated index and the generated tag is compared to the tag 46 associated with the index at each set.

If no set contains a matching tag at the address associated with the index (decision block 68), then the information is transferred from the access drive 38 to the memory cache 36 in block 70. Subsequently, the same information is transferred from the memory cache to the host I/O bus 12 via the host bus interface 14. In block 72, the block descriptor table is updated to reflect the newly stored information. This aspect of the invention is described below.

If one or more matches are detected in block 68, the usage information associated with each set which recorded a match is compared to determine which set has the most recently updated information (block 74). The usage information 50 associated with the set with the most recently updated information group 42 is set to a predetermined value indicating a hit. In block 76, the data is read from the cache memory from the cache address field 48 and is transferred to the host computer via the host bus interface 14.

If the read request involves more than one sector, the next sector will be found, if at all, at the next index in the same set in which the hit occurred. Hence, a sequence of sectors can be read from the memory cache 36 by addressing the same set at sequential indices. When the end of the set is reached, the next sector may be found by wrapping around to the beginning index of the set.

When data is transferred from a disk 38 into the memory cache 36, it may be necessary to remove previously stored information from the cache 36. To determine which memory will be cleared, the usage information associated with each memory group of each set at the specified index is checked to determine which set has had the lowest activity. Since the usage information for a group 44 is decremented each time a mismatch between tags occurs on that memory group 44, the lowest values are associated with the least used cached blocks. The magnitude of the usage information is referred to as its "vitality." The higher the number stored in the usage information of the memory group 44, the higher the vitality.

The usage information is only checked across memory groups 44 having the same index; other memory groups in the block descriptor table are not checked. This aging allows for a more even distribution of new blocks into the cache and protects frequently accessed information from being overwritten by less frequently accessed information.

When a write request is received from the host computer to write data blocks to the disk, a copy of each block is stored in the cache 36 as well as being written to the disk. The block descriptor table is then updated to reflect the new additions to the cache memory 36. If it is necessary to replace information in the cache during the write, the portion of the memory cache associated with the set having the less vitality at the specified index will be replaced.

When new information is written into the cache, either through a write request or because of a miss, the set having the lowest usage information at the index corresponding to the starting sector is chosen as the set which will be associated with the new information. If the new information includes more than one sector, then the additional sectors are sequentially associated contiguous memory groups 44 of the chosen set. As the sectors are stored in the memory cache 36, the usage information 50 of the associated memory group 44 is set to the highest vitality level.

Cache coherency management is performed during a host write operation to ensure that only the most recent copy of the sectors written to the disk remain valid in the memory cache 36. As each sector is written to the disk, a copy is written to the memory cache 36, as previously described. The block descriptor table is searched at the generated index for tag matches. A matching tag indicates an older copy of the sector. All copies of the sector being written to disk are invalidated by assigning a predetermined value, typically a "0", to the usage information associated with the corresponding memory group. Hence, at the end of the write operation, only the most recent copy of the sector remains valid within the memory cache 36. If multiple sectors are written to disk, then the block descriptor table is searched at the indices corresponding to each sector.

Many applications store data sequentially on the storage device. Hence, if the host processor requests information from a first section of the hard disk, it is likely that a future request would be for information which lies ahead of the already requested information. By prereading blocks of data ahead of the requested data, and by storing the preread blocks into the memory cache 36, future data requests may be anticipated. It should be noted, however, that in some applications, there is no benefit in prereading blocks of data because of the random nature of the request.

In the controller 10 of the present invention, the local processor 26 is operable to receive the first parameter from the host processor indicating the number of blocks requested. The local processor may preread blocks responsive to the request. The number of blocks which the controller 10 will preread is a function of the number of blocks actually requested. In the preferred embodiment, the number of blocks requested is multiplied by a predetermined factor to determine the number of blocks to preread. The implementation of the multiplication may be performed by a shift register which shifts the parameter indicating the number of requested blocks by a predetermined number of places. Hence, the parameter is multiplied by a factor of one, two, four, eight or other factors of $2^n$ depending on the desired range.

At some point, prereading additional blocks has little or no resulting benefit. Therefore, in the preferred embodiment, the local processor 26 may set a cap on the number of blocks to preread.

Table II illustrates the operation of the read-ahead and cap functions. It should be noted that the values entered in Table II are arbitrary for illustrative purposes only.

TABLE II

READ-AHEAD FACTOR AND CAP EXAMPLES

| HOST REQUESTED SECTORS | FACTOR VALUE | CAP VALUE | ACTUAL SECTORS READ |
|---|---|---|---|
| 1 | ×1 | 4 | 1 |
| 1 | ×2 | 4 | 2 |
| 4 | ×8 | 4 | 4 |
| 4 | ×8 | 32 | 32 |
| 6 | ×8 | 32 | 32 |

In Table II, the "factor value" column lists the factor value that a user may specify as the factor used as a multiplier in the sector read-ahead calculation. The "cap value" column lists the various cap values which a user may enter to specify as the maximum number of sectors to read beyond the number requested by the host. The "actual sectors" read column lists the actual number of sectors read by the memory cache 26 as defined by the factor and cap values.

In the first entry, the host computer requested one sector. The requested sector value was multiplied by the factor value, 1. Since the requested value times the factor (i.e., 1) is less than the cap value of four, one sector is actually read from the storage device 38. Thus, from this entry, the controller 10 has not read ahead.

The second entry, the host computer has requested one sector; however, the user has selected a factor value of two and a cap value of four. Hence, the two sectors are actually read from the storage device 38, since the requested value times the factor value is less than the cap value.

In the third entry, the host computer has requested four sectors and the factor value selected by the user is eight. Since the product of the requested value times the factor value is 32, and the cap value is 4, four sectors are read from the storage device 38. The fourth and fifth entries in Table II further illustrate the operation of the read-ahead factor and read-ahead cap.

FIG. 5 illustrates a screen display which allows the user to specify the read-ahead factor and the read-ahead cap, as well as to inform the user of the effectiveness of the cache configuration. Importantly, the screen display shows the number of sectors read by the host processor (since the cache was last emptied) and the number of sectors transferred from the cache that did not require a disk access. Based on the sectors read and the number of hits, a hit percentage is displayed. In the example of FIG. 5, 988 hits occurred for 1,000 sectors requested by the host processor, resulting in a hit percentage of approximately 98%.

Further, the screen display 80 displays the total number of sectors written from the host system. The total sectors transferred equals the sectors read plus the sectors written. Percentages are displayed for the percentage of reads and the percentage of writes relative to the total sectors transferred. The "total commands" field displays the total number of read and write requests issued by the host and the "sector/command" field displays the average sectors transferred per command.

Using the information shown in the screen display of FIG. 5, the user may adjust the parameters for the read-ahead factor and the read-ahead cap to maximize the effectiveness of the controller 10. The parameters used in conjunction with the controller 10 may vary from program to program. For this reasons, the controller 10 is responsive to commands which may be used in a "batch" file which would adjust the parameters prior to execution of the particular program.

Alternatively, an application program itself could adjust the read-ahead factor and read-ahead cap parameter values during execution of the program to maximize the efficiency of the controller 10. The read-ahead parameters could be adjusted according to the nature of the read requests. For example, for a database program, in instances where it is certain that large amounts of sequential data will be read from the storage device 38, the programmer could provide for the maximum read-ahead factor and maximum read-ahead cap. On the other hand, where it is not expected that further related data would be requested, the programmer could set the read-ahead factor to one.

Although the present invention has been described in detail, it should be understood that various changes, substitutions and alterations can be made herein without departing from the spirit and scope of the invention as defined by the appended claims.

What is claimed is:

1. A controller for transferring data between a host processing unit and a storage device comprising:
   a host interface for communicating with the host processing unit, said host interface receiving from the host processing unit one or more look-ahead parameters, one of said look-ahead parameters having a multiplying factor, one of said look-ahead parameters further having a maximum, said host interface further receiving read requests and associated address information including an address indicative of a starting location on said storage device and a first number indicative of a number of memory units to be read from said storage device;
   a storage interface for communicating with said storage device;
   a cache memory coupled with said host interface and storage interface for storing requested memory units; and
   a local processor coupled to the storage interface for initiating a transfer of a number of units from the storage device responsive to the look-ahead parameters to the cache memory, the number of units transferred being dependent upon and greater than said first number, said local processor multiplying said first number by the multiplying the number of memory units to be transferred, and said local processor limits the number of memory units to be transferred responsive to the maximum in said look-ahead parameters.

2. A controller for transferring data between a host processing unit and a storage device comprising:
   a host interface for communicating with the host processing unit, said host interface receiving from the host processing unit one or more look-ahead parameters, one of said look-ahead parameters having a multiplying factor, read requests and associated address information including an address indicative of a starting location on said storage device and a first number indicative of a number of memory units to be read from said storage device;
   a storage interface for communicating with said storage device;

a cache memory coupled with said host interface and storage interface for storing requested memory units; and a local processor coupled to the storage interface for initiating a transfer of a number of units from the storage device responsive to the look-ahead parameters to the cache memory, the number of units transferred being dependent upon and greater than said first number, said local processor multiplying said first number by the multiplying the number of memory units to be transferred, and said local processor receiving said multiplying factor during the execution of an application program by the host processing unit, such that the number of transferred memory units can be varied depending upon the nature of the information being read.

3. A controller for transferring data between a host processing unit and a storage device comprising:

a host interface for communicating with the host processing unit, said host interface receiving from the host processing unit one or more look-ahead parameters, one of said look-ahead parameters having a multiplying factor, read requests and associated address information including an address indicative of a starting location on said storage device and a first number indicative of a number of memory units to be read from said storage device;

a storage interface for communicating with said storage device;

a cache memory coupled with said host interface and storage interface for storing requested memory units; and a local processor coupled to the storage interface for initiating a transfer of a number of units from the storage device responsive to the look-ahead parameters to the cache memory, the number of units transferred being dependent upon and greater than said first number, said local processor multiplying said first number by the multiplying the number of memory units to be transferred, and said local processor multiplying said first number by shifting said first number by a predetermined number of bits to calculate the number of memory units to be transferred, such that said first number is multiplied by a factor of $2^n$, where n represents the number of shifts performed on said first number.

* * * * *

UNITED STATES PATENT AND TRADEMARK OFFICE
CERTIFICATE OF CORRECTION

PATENT NO. : 5,133,060

DATED : July 21, 1992

INVENTOR(S) : Theodore E. Weber et al.

It is certified that error appears in the above-identified patent and that said Letters Patent is hereby corrected as shown below:

Column 4, line 68, after "under" insert -- program --.

Signed and Sealed this

Ninth Day of November, 1993

Attest:

BRUCE LEHMAN

Attesting Officer

Commissioner of Patents and Trademarks